United States Patent
Lee et al.

(10) Patent No.: US 10,472,529 B2
(45) Date of Patent: Nov. 12, 2019

(54) INK COMPOSITION FOR POWDER BED AND INKJET HEAD 3D PRINTING

(71) Applicant: KOREA INSTITUTE OF SCIENCE AND TECHNOLOGY, Seoul (KR)

(72) Inventors: Heonju Lee, Seoul (KR); Myoungwoon Moon, Seoul (KR); Wonjin Jo, Seoul (KR); Sangsoo Han, Seoul (KR); Haeshin Lee, Seoul (KR); Intaek Song, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 297 days.

(21) Appl. No.: 15/308,414

(22) PCT Filed: Mar. 28, 2016

(86) PCT No.: PCT/IB2016/051741
§ 371 (c)(1),
(2) Date: Nov. 2, 2016

(87) PCT Pub. No.: WO2016/147165
PCT Pub. Date: Sep. 22, 2016

(65) Prior Publication Data
US 2017/0066936 A1    Mar. 9, 2017

(30) Foreign Application Priority Data
Mar. 19, 2015    (KR) ..................... 10-2015-0038307

(51) Int. Cl.
*B29C 64/165* (2017.01)
*C09D 11/03* (2014.01)
(Continued)

(52) U.S. Cl.
CPC .......... *C09D 11/03* (2013.01); *B29C 71/0009* (2013.01); *B33Y 70/00* (2014.12);
(Continued)

(58) Field of Classification Search
None
See application file for complete search history.

(56) References Cited

U.S. PATENT DOCUMENTS

| | | | | |
|---|---|---|---|---|
| 4,544,624 A | * | 10/1985 | Nanpei | ................. C08F 283/00 430/281.1 |
| 4,762,875 A | | 8/1988 | Gold | |

(Continued)

FOREIGN PATENT DOCUMENTS

| | | |
|---|---|---|
| CN | 104260357 A | 1/2015 |
| JP | 2001-323195 A | 11/2001 |

(Continued)

OTHER PUBLICATIONS

Ryu, J. et al., "Mussel-Inspired Polydopamine Coating as a Universal Route to Hydroxyapatite Crystallization," Advanced Functional Materials, vol. 20.13, 2010 (pp. 2132-2139).

(Continued)

*Primary Examiner* — Monica A Huson
*Assistant Examiner* — Kelsey C Grace
(74) *Attorney, Agent, or Firm* — NSIP Law

(57) ABSTRACT

The present invention relates to an ink composition containing a multifunctional adhesive suitable for a three-dimensional (3D) printer and the use thereof. The multifunctional adhesive of the present invention contains a compound with a catechol group and exhibits excellent adhesion to various materials (e.g. dry plaster powders, polymers, metals, ceramics, and composite materials). The use of the ink composition of the present invention containing the multifunctional adhesive enables the processing of various functional materials that were difficult to fabricate into a 3D structure. Therefore, it is highly likely that the ink composition of the present invention can effectively create a market for functional materials for a 3D printer and find new areas of application (e.g. automotive, medical, fashion, aviation/aerospace, construction, consumer electronics, entertainment, etc.).

9 Claims, 5 Drawing Sheets

(51) Int. Cl.
  B33Y 70/00 (2015.01)
  B29C 71/00 (2006.01)
  B29K 105/00 (2006.01)
(52) U.S. Cl.
  CPC .............. *B29K 2105/0032* (2013.01); *B29K 2105/0044* (2013.01); *B29K 2105/0097* (2013.01); *B29K 2105/251* (2013.01)

(56) References Cited

U.S. PATENT DOCUMENTS 5,073,448 A * 12/1991 Vieira .................. B41M 5/5227
  347/105
5,922,505 A *  7/1999 Sonokawa ............ G03F 7/0752
  101/453
2014/0252672 A1  9/2014 Rael

FOREIGN PATENT DOCUMENTS

JP   2012-157653 A   8/2012
JP    2014-65857 A   4/2014

OTHER PUBLICATIONS

Yamada, K. et al., "Chitosan based water-resistant adhesive. Analogy to mussel glue," American Chemical Society, Biomacromolecules, vol. 1.2, 2002 (pp. 252-258).
Korean Office Action dated Nov. 7, 2016 in corresponding Korean Patent Application No. 10-2015-0038307 (8 pages with English abstract).

* cited by examiner

[FIG. 1]
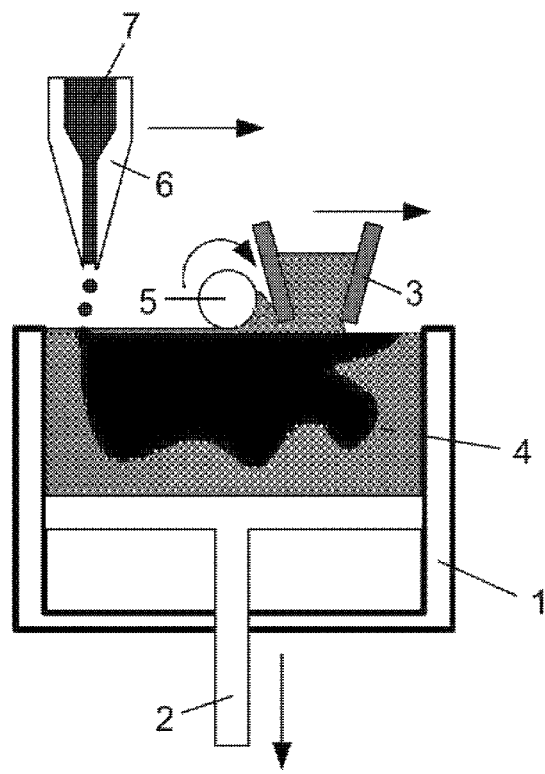
[FIG. 2]
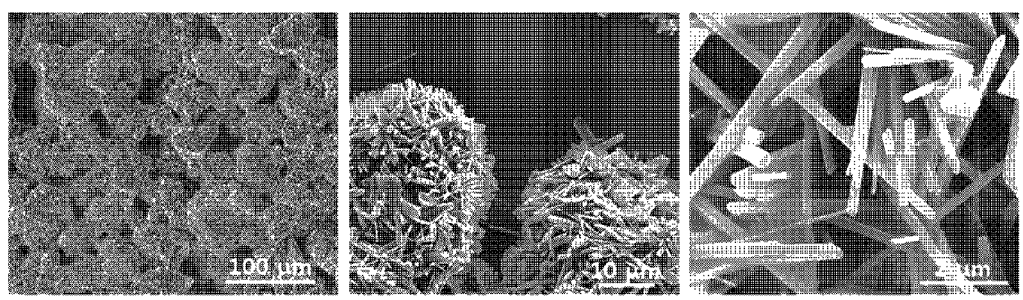

[FIG. 3]
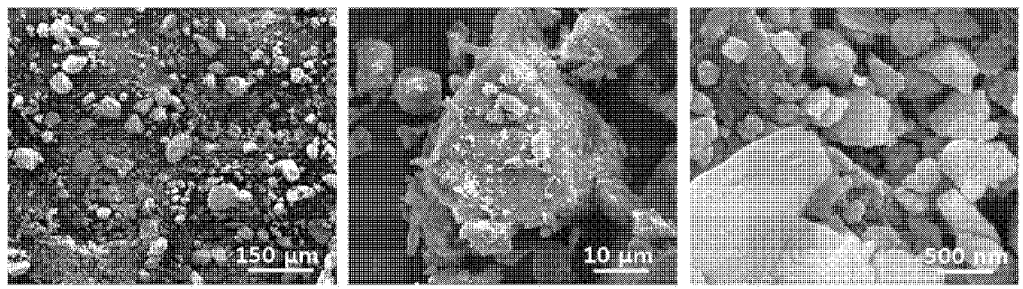
[FIG. 4]
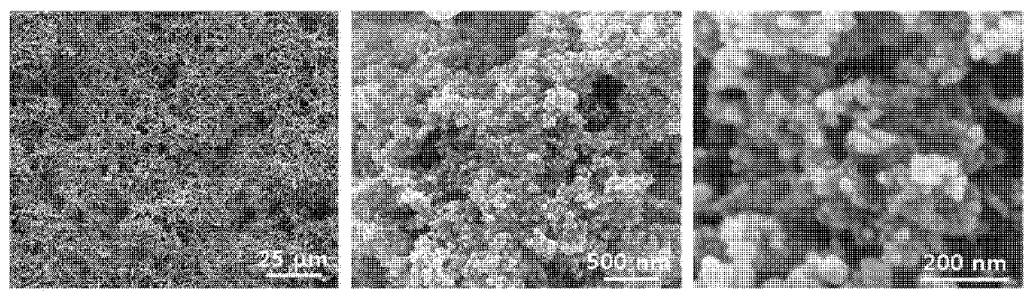
[FIG. 5]
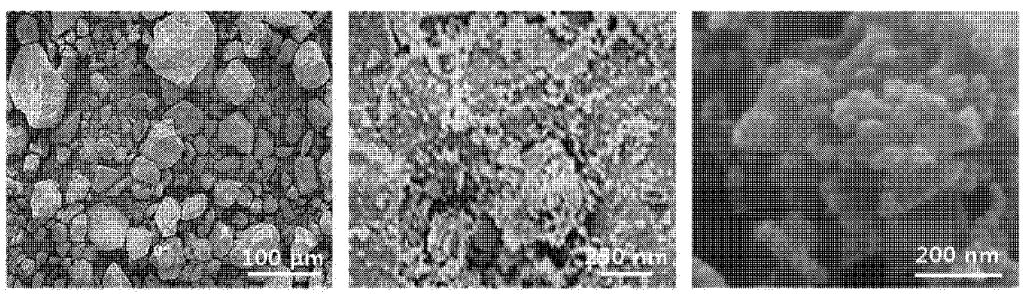

[FIG. 6]
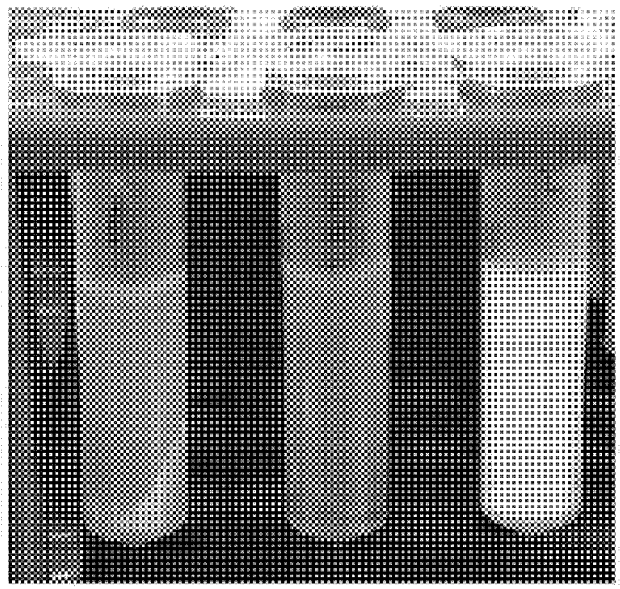
[FIG. 7]
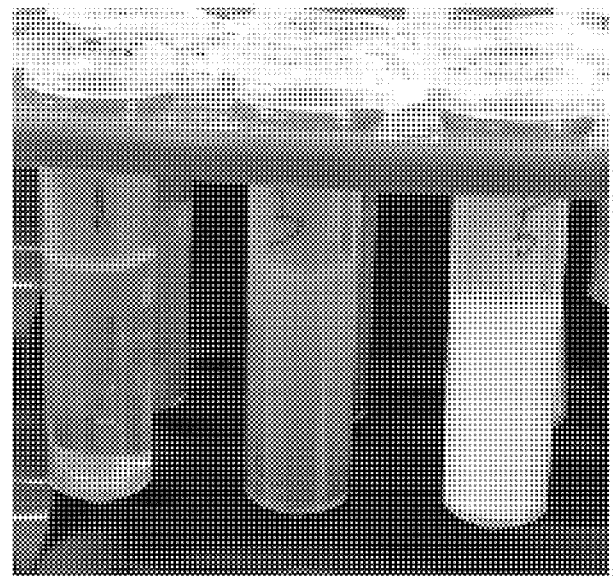

[FIG. 8]
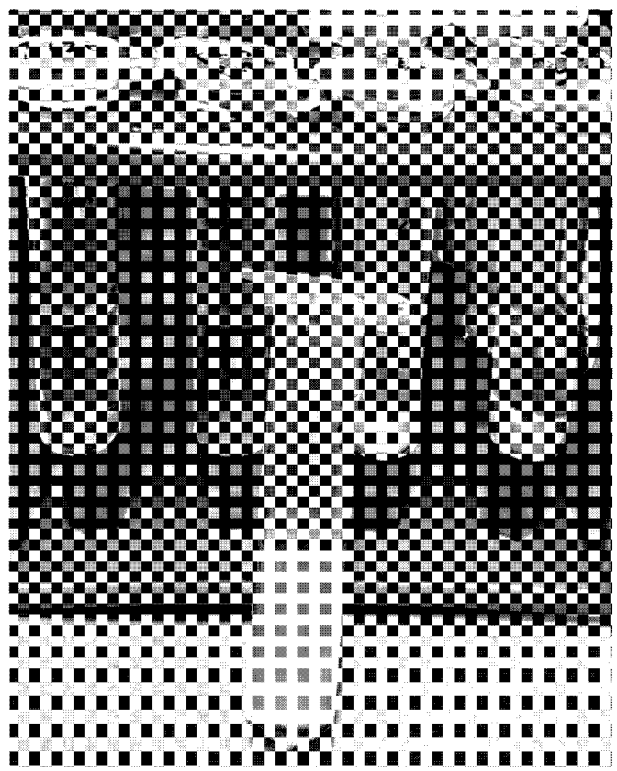
[FIG. 9]
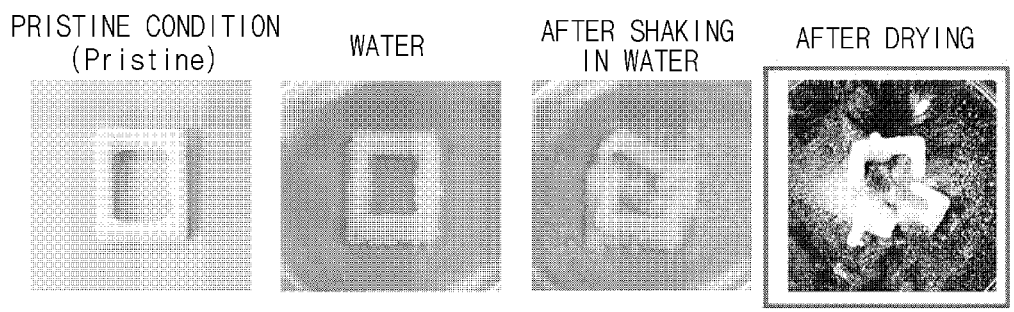

[FIG. 10]
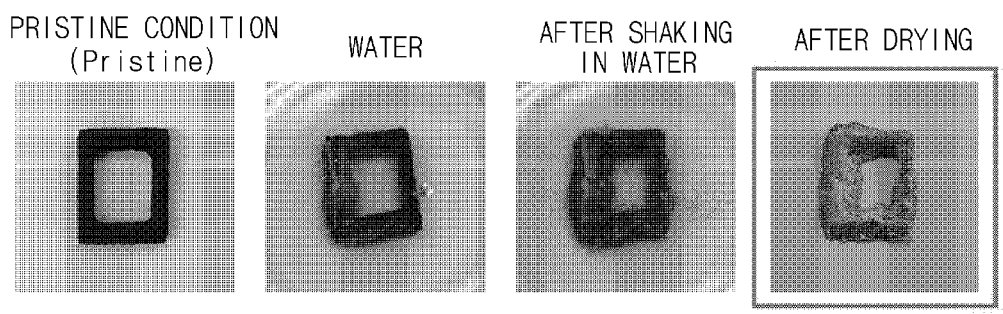

INK COMPOSITION FOR POWDER BED AND INKJET HEAD 3D PRINTING

CROSS REFERENCE TO RELATED APPLICATION(S)

This application is a National Phase entry of PCT Application No. PCT/IB2016/051741, filed on Mar. 28, 2016, which claims the benefit of Korean Patent Application No. 10-2015-0038307 filed Mar. 19, 2015, in the Korean Intellectual Property Office, the entire disclosure of which is incorporated herein by reference for all purposes.

TECHNICAL FIELD

The present invention relates to an ink composition containing a general-purpose adhesive suitable for a three-dimensional (3D) printer and a use thereof.

BACKGROUND ART

Additive manufacturing (AM) is a technique for fabricating a desired object through a process of adding a material based on three-dimensional (3D) geometric data, and is the opposite of traditional manufacturing processes such as subtractive manufacturing. It is commonly carried out by adding layer-upon-layer of material and is also referred to as additive fabrication, additive processes, an additive technique, or additive layer manufacturing. 3D printers were initially used for industrial purposes in the late 1980s in line with the development of computers that enabled the production of 3D miniatures or prototypes based on computer aided drawing (CAD) data in a short time at inexpensive prices, and have been widely used as a way of rapid prototyping (RP), mostly in product design and validation phases. Compared to other conventional manufacturing processes, AM is known to reduce about 50% or more of the energy and about 90% or more of the materials spent on the production. Because of such benefits that the technique offers, AM is widely used in various fields including the industrial fields of automotive, aerospace, construction, and household appliances, including manufacturers such as Siemens, BMW, Volkswagen, GM, NASA, GE, BOSE, HP, and the like.

Above all, a powder bed and inkjet head 3D printing technique is a method of accumulating layers by uniformly spreading a powder material into a thickness of several hundred micrometers ($\mu m$) and spraying an adhesive thereon with an inkjet printer to induce adhesion in desired areas only. The powder material in the areas to which the adhesive was not sprayed is removed by pneumatic pressure to finally obtain a desired 3D shape, and the final 3D structure is normally attained through a second curing process using an adsorbent. However, the structure attained by the spraying of an adhesive may be dried by heat treatment before removing the powder, which is a widely used method despite a rather low precision level (usually 100 $\mu m$ or less) compared to other additive manufacturing techniques, because the method enables the recycling of the powder material and the easy manufacturing of even a 3D structure suspended in midair. In particular, since the formation of various functional materials possible would be made possible, should various functional materials and adhesives in powder forms be developed, there is a growing interest for the powder bed and inkjet head 3D printing technique among numerous additive manufacturing techniques.

A number of papers and patent documents are referenced and the citations thereof are displayed throughout the present specification. The disclosures of the cited papers and patent documents are incorporated herein by reference in their entirety to describe the level of the art and the contents of the present invention more clearly.

DISCLOSURE

Technical Problem

The present inventors endeavored to develop a multifunctional adhesive that is effectively applicable for various functional materials used for three-dimensional (3D) printing. As a result, the present inventors confirmed that a compound (e.g. a mussel-derived polydopamine) containing a catechol group can function as an adhesive effective in binding a powder with various materials (e.g. polymers, metals, ceramics, composite materials, etc.) and that a structure much more stable than the 3D-printed structures produced from using a conventional binder can be attained from 3D printing with the use of an ink composition containing the compound, and thereby completed the present invention.

Therefore, the present invention is directed to providing an ink composition for 3D printing.

In addition, the present invention is directed to providing a method of producing a structure using 3D printing.

Moreover, the present invention is directed to providing a 3D printing system using the aforementioned ink composition.

Other objectives and advantages of the present invention will become more apparent from the following detailed descriptions of the invention, claims, and drawings.

Technical Solution

In one aspect of the present invention, the present invention provides an ink composition for 3D printing containing an adhesive, a solvent, a stabilizer, and a viscosity controlling agent, wherein the adhesive is a compound containing a catechol group.

In another aspect of the present invention, the present invention provides a method of producing a structure by 3D printing, wherein the method includes the following processes of:

(a) preparing the aforementioned ink composition; and
(b) producing the structure (part) by introducing the composition into a 3D printer and continuously supplying a powder material.

In still another aspect of the present invention, the present invention provides a 3D printing system using the aforementioned ink composition.

The present inventors endeavored to develop a multifunctional adhesive that is effectively applicable for various functional materials used for 3D printing. As a result, the present inventors confirmed that a compound (e.g. a mussel-derived polydopamine) containing a catechol group can function as an adhesive effective in binding a powder with various materials (e.g. polymers, metals, ceramics, composite materials, etc.) and that a structure much more stable than the 3D-printed structures produced from using a conventional binder can be attained from 3D printing with the use of an ink composition containing the compound.

3D printing is a technique of producing a solid product having a 3D form by injecting, accumulating, or compacting a raw material (e.g. a powder, a plastic, a polymer, a metal, ceramic, glass, a composite material, etc.), is a technique superior to traditional materials manufacturing techniques in various aspects including price, convenience of use, customization potential, and the like. The materials usable for 3D printing vary widely, and examples thereof include plastics such as acrylonitrile butadiene styrenes (ABSs), polylactic acids (PLAs), acryls, and polycarbonates (PCs), various metals, powders such as a dry plaster powder, waxes, rubbers, wood (sawdust), paper, glass, and ceramics. In addition, 3D printing can be classified into powder bed and inkjet head 3D printing (PBP), selective laser sintering (SLS), digital light processing (DLP), stereolithography (SLA), PolyJet (photopolymer jetting technology), fused deposition modeling (FUM), multi jet modeling (MJM), laminated object manufacturing (LOM), anti-gravity object modeling (AOM), and the like, depending on the materials used. Most commonly used 3D printing methods include PBP, a resin extrusion method (FDM), photocurable resin prototyping (SLA), DLP, powder-based rapid prototyping (SLS), and the like.

In one embodiment of the present invention, the 3D printing system for which the ink composition of the present invention is used is a PBP system.

However, 3D printing techniques generally have problems such as a very low speed of accumulating layers, low model strength, the difficulty of mixing materials and colors, the requirement of a highly sophisticated 3D graphic design technique, and the like, with the issues pertaining to the speed of accumulating layers and the strength being particularly serious.

Hence, the present invention provides an ink composition for 3D printing that improves the aforementioned problems of 3D printing (especially, PBP) and contains a multifunctional adhesive ingredient (or an adhesive) applicable to more various materials both conveniently and effectively.

In one embodiment of the present invention, the ink composition of the present invention contains an adhesive, a solvent, a stabilizer, and a viscosity controlling agent. More specifically, the ink composition contains 10 to 30% by volume of an adhesive, 40 to 60% by volume of a solvent, 5 to 10% by volume of a stabilizer, and 20 to 40% by volume of a viscosity controlling agent. Even more specifically, the ink composition contains 10 to 15% by volume of an adhesive, 45 to 55% by volume of a solvent, 5 to 6% by volume of a stabilizer, and 25 to 30% by volume of a viscosity controlling agent. For example, the mixing ratio of the ingredients may be an adhesive solution at 10 to 15%, isopropyl alcohol (IPA) at 50%, 2-ethylhexanoic acrylate (2-EHA) at 5 to 6%, and 2-ethylhexanoic acid at 25-30%.

The adhesive ingredient of the present invention exhibits excellent adhesion to various functional materials (e.g. dry plaster powders, polymers, metals, ceramics, and composite materials). In order to be sprayed by an inkjet printer, it is required for the adhesive ingredient to be suitably spread upon spraying, rapidly evaporate after being sprayed, and not clog the spray nozzle. In addition, the adhesive ingredient should be evenly spread into powder particles and not react with the powder in any way besides adhesion. Typically, conventional adhesive ingredients selectively reacted with particular powder types, thus narrowly limiting the types of materials that can be used for the fabrication of an object, but the adhesive ingredient of the present invention strongly adheres to almost all types of materials, regardless of the hydrophilicity/hydrophobicity, surface tension, or polarity of the powder material. Therefore, the use of an adhesive containing the adhesive ingredient of the present invention enables the processing of the functional materials that were difficult to be formed into a 3D structure, by the powder bed and inkjet head 3D printing technique.

In addition, when the adhesive to be sprayed by an inkjet printer is contained in an ink for an inkjet printer, it is required for the adhesive to be an anhydrous additive and not affect the pH of the ink. In the presence of a small amount of moisture, a hydration reaction may be induced to cause condensation, which leads to a local change of ink density and disturbs the maintenance of uniformity in the distribution of the additives. This may result in a nonuniform ink concentration and the clogging of the nozzle. Further, since a contact with air may also cause the aforementioned phenomenon, the liquid adhesive should be prevented from contacting the air as much as possible.

In one embodiment of the present invention, the ink composition of the present invention has the Ohnesorge number (Oh) of 1.0 or less, and more specifically, has the Ohnesorge number ranging from 0.1 to 1.0.

The adhesive ingredient that may be used in the present invention contains a compound with a catechol group. The expression "a compound containing (with) a catechol group" used herein refers to a molecule containing a catechol molecule and/or a catechol derivative molecule and having an adhesive property. The catechol molecule is also known as 1,2-dihydroxybenzene or pyrocatechol, and the catechol derivative is a substance whose molecule contains a benzene ring and two hydroxyl groups bonded to the benzene ring. More specifically, the adhesive ingredient that may be used in the present invention contains at least one compound selected from the group consisting of dopamine, polydopamines, dihydroxybenzene, alpha-methyldopamine, norepinephrine, dihydroxyphenylalanine, alpha-methyldopa, droxidopa, 5-hydroxydopamine, chitosan-catechol, hyaluronic acid-catechol, and alginate-catechol, and still more specifically, contains a polydopamine, chitosan-catechol, hyaluronic acid-catechol, and alginate-catechol, but is not limited thereto. A polydopamine or chitosan-catechol is a material synthesized in mussels and is known to strongly adhere to almost all types of surfaces, irrespective of the peculiarity of those surfaces, and such an adhesive property is known to last even in water [Jungki Ryu et al., 'Mussel-Inspired Polydopamine Coating as a Universal Route to Hydroxyapatite Crystallization', ADV. FUNCT. MATER., vol. 20: 2132-2139 (2010); Kazunori Yamada et al., 'Chitosan Based Water-Resistant Adhesive Analogy to Mussel Glue', *Biomacromolecules*, vol. 1 (2): 252-258 (2000)].

The term "liquid adhesive" used herein refers to a spraying solution that contains an adhesive in the form of an ink and can be sprayed through an inkjet head. In the present specification, the term is used interchangeably with "adhesive ingredient" or "adhesive".

In addition to the adhesive, the ink composition of the present invention contains a solvent, an ink stabilizer, and a viscosity controlling agent.

In one embodiment of the present invention, the solvent that may be used in the ink composition of the present invention is any solvent, as long as it does not contain water, and more specifically, the solvent is an alcohol-based solvent. For example, the alcohol-based solvent may be methanol, ethyl alcohol, methyl alcohol, glycerol, propylene glycol, isopropyl alcohol, isobutyl alcohol, polyvinyl alcohol, cyclohexanol, octyl alcohol, decanol, hexadecanol, ethylene glycol, 1,2-octanediol, 1,2-dodecanediol, 1,2-hexadecanediol, and a mixture thereof, but is not limited thereto.

The term "ink stabilizer" used herein refers to a substance that maintains the state of an ink for a long time by inhibiting a hydration reaction that may occur in the composition of the ink. The ink stabilizer that may be used in the ink composition of the present invention may be any common ink stabilizer used for inkjet printing. Specifically, examples of such an ink stabilizer include anhydrous 2-EHA with added ethylhexanoate, 2-methoxyethanol (2-ME), 2-butoxyethanol, hydroxyethyl cellulose, methyl cellulose, ethyl cellulose, starch, casein, gelatin, polyvinyl alcohol, water-soluble polymers such as styrene-maleic anhydride (SMA) copolymers, hydroxypropyl modified guar gum, arabic gum, and xanthan gum, but are not limited thereto. In one example of the present invention, the ink stabilizer that may be used in the ink composition of the present invention is anhydrous 2-EHA or 2-ME.

What is of significant importance for an ink composition with an added adhesive is the viscosity and surface tension of the ink, for which the Ohnesorge number at room temperature (20-25° C.) of the ink composition of the present invention should be maintained within the range of 0.1 to 1.0. This corresponds to the conditions in which the ink can pass through a spray nozzle without resulting in clogging, and, at the same time, when sprayed on the surface of powder particles in a powder bed, can be soaked into the surface in a stable manner without bouncing off.

The viscosity controlling agent that may be used in the ink composition of the present invention may be any viscosity controlling agent commonly used in an ink composition. Examples of such a viscosity controlling agent include 2-ethylhexanoic acid, 1,2-propanediol and derivatives thereof, 1,3-propanediol and derivatives thereof, and glycerol, but are not limited thereto. In one embodiment of the present invention, the viscosity controlling agent that may be used in the ink composition of the present invention is ethylhexanoic acid or 1,2-propanediol.

Further, a dispersant may be additionally contained in the ink composition of the present invention to control the viscosity of the composition. The dispersant may be a resin-type dispersant, and examples thereof may include water-soluble acrylic resins, styrene-acryl (SA) copolymeric resins, polyester resins, polyamide resins, polyurethane resins, and fluoro resins.

In addition, the ink composition of the present invention may further contain an oxidizing agent and a dye. In one example of the present invention, a variety of substances known in the art to be suitable for an ink composition may be used as the oxidizing agent for the ink composition of the present invention, and examples thereof include piperidine and derivatives thereof, but are not limited thereto.

The dye that may be contained in the ink composition of the present invention may be prepared variously for use, depending on purpose or application. The dye that may be used in the present invention is a dye that is substantially insoluble in water, and specifically, has the solubility of 1 g or less in water at 25° C. Examples of such a dye may include a yellow dye, a magenta dye, and a cyan dye.

In one embodiment of the present invention, the dye that may be used in the ink composition of the present invention is an organic or inorganic dye listed in the Colour Index International. For example, a red or magenta dye is Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, or Pigment Orange 13, 16, 20, 36; a blue or cyan dye is Pigment Blue 1, 15, 15:1, 15:2, 15:3, 15:4, 15:6, 16, 17-1, 22, 27, 28, 29, 36, or 60; a green dye may be Pigment Green 7, 26, 36, or 50; a yellow dye is Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193; a black dye is Pigment Black 7, 28, or 26; and a white dye is Pigment White 6, 18, or 21, but the dyes are not limited to those listed above.

As mentioned above, the ink composition of the present invention has a composition and properties suitable for a 3D printer. Accordingly, the present invention provides a convenient method of fabricating a 3D structure by 3D printing that uses the aforementioned ink composition.

First, the ink composition of the present invention is prepared.

Since the method of producing a 3D structure according to the present invention involves the use of the aforementioned ink composition, the descriptions in common are not provided any further to avoid an excessive complication of the present specification.

Next, a 3D structure is fabricated by introducing the ink composition into a spray nozzle part of a 3D printer and continuously supplying powder to a powder bed. It was found that the ink composition of the present invention has a highly excellent adhesive property, and thus, enables the construction of a final 3D structure much more stable in water than the structures fabricated using a conventional binder are (see FIGS. 9 and 10). Examples of a binder that may be commonly used include water-insoluble polymeric binders, cellulose derivatives, polyamides and copolymers thereof, polyesters and copolymers thereof, phenolic resins, and polyanhydrides.

In one embodiment of the present invention, the fabrication method of the present invention may further include a post-processing treatment (c) process.

The post-processing treatment (c) may be included in or excluded from the entire course of the 3D structure fabricating method of the present invention, and various methods performed in the art may be used for such treatment. For example, the structure may be polished with a post-processing material or finished with a finish type. Alternatively, both of the mentioned processes may be carried out.

In one embodiment of the present invention, the post-processing material is a resin, an epoxy resin, an acrylic resin, Dragon Skin®, or a fiber-reinforced plastic (FRP), but is not limited thereto.

In one embodiment of the present invention, the finish type is a resin finish, a sand-blasted finish, a resin dye finish, or an integral color finish, but is not limited thereto.

The adhesive of the present invention to be used for a 3D printer is a multifunctional adhesive usable for the adhesion of various materials with different functions, in contrast to the conventional adhesives that are reactive only to particular powder types, thus narrowly limiting the types of materials that can be used for the fabrication of an object. Therefore, the present invention provides a very interesting and novel adhesive that enables the use of a powder bed and inkjet head 3D printing technique for the processing of various materials that were normally difficult to fabricate into a 3D structure.

Advantageous Effects

The features and advantages of present invention can be summarized as follows:

(a) The present invention relates to an ink composition containing a multifunctional adhesive suitable for a 3D printer and the use thereof.

(b) The multifunctional adhesive of the present invention contains a compound with a catechol group and exhibits excellent adhesion to various materials (e.g. dry plaster powders, polymers, metals, ceramics, and composite materials).

(c) The use of the ink composition of the present invention containing the multifunctional adhesive enables the processing of various functional materials that were difficult to fabricate into a 3D structure.

(d) Therefore, it is highly likely that the ink composition of the present invention can effectively create a market for functional materials for a 3D printer and find new areas of application (e.g. automotive, medical, fashion, aviation/aerospace, construction, consumer electronics, entertainment, etc.).

DESCRIPTION OF DRAWINGS

FIG. 1 is a schematic diagram of a powder bed and inkjet head three-dimensional (3D) printing system. In the diagram, 1 denotes a box containing a material in a powder form, 2 denotes a device enabling the accumulation of the powder by adjusting the height of the powder with a piston, 3 denotes a device for supplying the material in a powder form, 4 denotes the material in a powder form, which is usually a dry plaster powder or a polymer, 5 denotes a device with a roller that evenly spreads the powder that has been supplied, 6 denotes a device for supplying a liquid adhesive, and 7 denote a special liquid adhesive.

FIGS. 2 to 5 are results showing the binding effectiveness of a polydopamine Compared to conventional binders, a polydopamine can effectively enable the adhesion of $TiO_2$ to a powder surface.

FIGS. 6 to 8 are the results of centrifugation showing that a polydopamine can effectively cause the adhesion of $TiO_2$ to a powder.

FIG. 9 and FIG. 10 are experimental results respectively showing the stability of 3D-printed structures fabricated using an adhesive with or without a polydopamine.

MODES OF THE INVENTION

Hereinafter, the present invention will be described in further detail with reference to exemplary embodiments. The exemplary embodiments are only for describing the present invention more specifically, and it will be clear to those skilled in the art that the gist and scope of the present invention are not limited to those exemplary embodiments

EXAMPLES

Example 1: Analysis of Polydopamine Adhesive Properties

FIG. 1 is a simple schematic diagram describing the present invention and shows the applicability of the present invention to various materials, not like the conventional adhesives for a powder bed and inkjet head three-dimensional (3D) printing technique, the uses of which were restricted to limited material types. The "adhesive" normally refers to a spraying solution containing an adhesive in the form of an ink that can be sprayed through an inkjet head. Besides a liquid adhesive, the solution may contain an ink stabilizer, a solvent, a viscosity controlling agent, a dye, and the like. Each of the ingredients may be contained in a varying amount depending on use, but it is highly important that moisture is not contained in the composition and that the Ohnesorge number (Oh) is in the range of 0.1 to 1.0 for spraying and evaporation. The Ohnesorge number greater than 1.0 is not desirable, because in this case, the solution drops in the form of satellite drops, causing the phenomenon of a water drop bursting upon contacting a surface. In addition, when the Ohnesorge number is 0.1 or less, the high viscosity causes the spraying of the solution to become difficult and hinders the formation of water drops. Therefore, the Ohnesorge number within the range of 0.1 to 1.0 is very important for the uniform spraying of the solution. The Ohnesorge number can be calculated as follows:

$$Oh = \frac{\mu}{\sqrt{\rho \sigma L}} = \frac{\sqrt{We}}{Re} \sim \frac{\text{viscous forces}}{\sqrt{\text{inertia} \cdot \text{surface tension}}}$$

In the above equation, $\mu$ is the viscosity coefficient, $\sigma$ is the surface energy, $\rho$ is the density, L is the characteristic length scale, Re is the Reynolds number, and We is the Weber number [B. Derby and N. Reis, "Inkjet Printing of Highly Loaded Particulate Suspensions", *MRS Bulletin*, pp. 815-818 (2003)]. The Ohnesorge number of each ingredient can be calculated using the above equation.

The conventional powder bed and inkjet head 3D printing system took advantage of binding between a material in a powder form 4 and a special liquid adhesive 7 as a result of a particular reaction (i.e. a self-hydration reaction) therebetween (FIG. 1). As can be seen in FIG. 2, the present inventors have found that the mixing of a conventional binder (VisiJet PXL™ clear; 3D Systems, Inc., U.S.) and 250 mg of a powder (a dry plaster powder ($CaSO_4$); 3D Systems, Inc. U.S.) resulted in a particular chemical reaction due to the water contained in the binder composition, which led to the deformation of a part of the powder surface into a rod-like shape. Such deformation is a result of a self-hydration reaction that occurred due to the binder composition and converted $CaSO_4$ into recrystallized gypsum. In contrast, when a polydopamine (2 mg/ml; Sigma-Aldrich Co., U.S.) dissolved in ethanol was mixed with a powder, a deformation into a rod-like shape was not observed on the powder surface because of the lack of water (FIG. 3).

To study if the polydopamine can have an adhesion property that is equal, similar, or superior to that of a conventional binder, the present inventors examined the roles of a binder and a polydopamine in the adhesion between a powder and $TiO_2$ (2.5 mg). As shown in FIGS. 4 and 5, it could be observed that a polydopamine as well as a conventional binder enabled the adhesion of $TiO_2$ to a powder surface.

Example 2: Analysis of Adhesion of Polydopamine Adhesive

To study the functionality of a polydopamine as a general-purpose adhesive in more detail, the ingredients were mixed in the composition shown in the following Table 1 for 24 hours at room temperature. The precipitates obtained by the centrifugation of the liquid mixture were washed with ethanol 5 times. The mixture that had been washed was then centrifuged at 1,200 rpm and 2,000 rpm, and the precipitation status was observed.

TABLE 1

| Sample number | Composition | Mixing condition |
|---|---|---|
| 1 | (Ethanol + $TiO_2$ + powder + dopamine) | Four ingredients are mixed together |

TABLE 1-continued

| Sample number | Composition | Mixing condition |
|---|---|---|
| 2 | (Ethanol + powder + dopamine) + TiO$_2$ | TiO$_2$ is added after binding dopamine to the powder |
| 3 | (Ethanol + TiO$_2$ + powder + dopamine + piperidine) | An oxidizing agent (piperidine) is added to Sample 1 |
| 4 | (Ethanol + powder + dopamine + piperidine) + TiO$_2$ | TiO$_2$ is added to Sample 2 |
| 5 | (Ethanol + TiO$_2$ + powder) | Ingredients are mixed in an absence of the dopamine adhesive |

Excellent Adhesion of Polydopamine

More specifically, when the precipitation by centrifugation was performed at 1,200 rpm, the added dopamine (2 mg/ml; dissolved in ethanol) induced the stable adhesion of TiO$_2$ (2.5 mg) to the powder (250 mg), leading to the formation of distinct precipitates. In contrast, in an absence of the dopamine adhesive, TiO$_2$ did not adhere to the powder, and precipitates were not produced during centrifugation at 1,200 rpm (FIG. 6). When the precipitation was performed at a centrifugation speed of 2,000 rpm, the precipitates were obtained only when dopamine was added, and such precipitation occurred in a more stable manner in a sample containing dopamine as the sole additive than in a sample containing an oxidizing agent as well. Still, in an absence of the dopamine adhesive, TiO$_2$ did not adhere to the powder, and any precipitate was not produced during centrifugation at 2,000 rpm (FIG. 7).

In addition, the ingredients in parentheses in Samples 1 to 4 of Table 1 were first mixed and then were dried. The dried mixture was again added to ethanol and then was subjected to centrifugation. When the centrifugation was performed at 2,000 rpm, all of Samples 1 to 4 were well precipitated and could be separated with ease. Moreover, when the addition of TiO$_2$ was performed after the drying of a mixture of other ingredients (i.e. Samples 2 and 4), the adhesion of TiO$_2$ occurred successfully and precipitates were observed (FIG. 8). In contrast, Sample 5, which did not contain dopamine, still did not produce any precipitate.

Example 3: 3D Printing Using Polydopamine Adhesive

To demonstrate the effectiveness of a polydopamine in 3D printing, the present inventors performed 3D printing in both absence (FIG. 9) and presence (FIG. 10) of a polydopamine, and studied the stability of the 3D-printed structures produced therethrough. The pristine forms thereof were fabricated successfully regardless of the presence or absence of a polydopamine. However, upon immersion in water (the second panels of FIGS. 9 and 10), the 3D-printed structure fabricated using an adhesive containing a polydopamine was more stable than the 3D-printed structure produced using an adhesive without a polydopamine. Moreover, when respectively shaken at 100 rpm in water, the 3D-printed structure fabricated using the adhesive with a polydopamine maintained its structure in a more stable manner (the third panels of FIGS. 9 and 10). The 3D-printed structure fabricated using the adhesive without a polydopamine (control) was completely destroyed in most areas after being shaken in water, and was not preserved even after being dried at room temperature (the fourth panel of FIG. 9). In contrast, the 3D-printed structure produced using the adhesive with a polydopamine and maintained with higher stability even after shaking in water was sustained even after drying at room temperature (the fourth panel of FIG. 10). Therefore, the present inventors substantially confirmed that an adhesive containing a polydopamine is effectively applicable to 3D printing.

Detailed descriptions of specific parts of the context of the present invention have been provided above. However, it will be clear to those skilled in the art that such specific descriptions are merely exemplary and do not limit the scope of the present invention. Therefore, the actual scope of the present invention is determined by the appended claims and their equivalents.

The invention claimed is:

1. An ink composition for three-dimensional (3D) printing, comprising:
   an adhesive;
   a solvent;
   a stabilizer; and
   a viscosity controlling agent,
   wherein the adhesive is a compound containing a catechol group, and
   wherein the ink composition contains the adhesive at 10 to 30% by volume, the solvent at 40 to 60% by volume, the stabilizer at 5 to 10% by volume, and the viscosity controlling agent at 20 to 40% by volume.

2. The ink composition of claim 1, wherein the ink composition has an Ohnesorge number (Oh) ranging from 0.1 to 1.0.

3. The ink composition of claim 1, wherein the adhesive is selected from a group consisting of a polydopamine, a chitosan-catechol, a hyaluronic acid-catechol, and an alginate-catechol.

4. The ink composition of claim 1, wherein the solvent is an alcohol-based solvent.

5. The ink composition of claim 1, wherein the stabilizer is anhydrous 2-ethylhexyl acrylate (2-EHA) or 2-methoxyethanol (2-ME).

6. The ink composition of claim 1, wherein the viscosity controlling agent is ethylhexanoic acid or 1,2-propanediol.

7. The ink composition of claim 1, wherein the ink composition further comprises an oxidizing agent or a dye.

8. The ink composition of claim 7, wherein the oxidizing agent is piperidine.

9. The ink composition of claim 7, wherein the dye is an organic or inorganic dye listed in the Colour Index International.

* * * * *